United States Patent [19]

Petrovich

[11] 4,362,552
[45] Dec. 7, 1982

[54] FROTH FLOTATION OF ORES

[76] Inventor: Vojislav Petrovich, 1935, W. Schiller St., Chicago, Ill. 60622

[21] Appl. No.: 7,314

[22] Filed: Jan. 29, 1979

[51] Int. Cl.$^3$ .......................... B03D 1/02; C22B 3/00
[52] U.S. Cl. .......................................... 75/2; 209/166
[58] Field of Search ..................... 75/2; 209/5, 9, 166, 209/167

[56] References Cited

U.S. PATENT DOCUMENTS

| | | | |
|---|---|---|---|
| 2,861,687 | 11/1958 | Lord | 209/167 |
| 3,910,836 | 10/1975 | Raby et al. | 209/166 |
| 3,923,647 | 12/1975 | Petrovich | 209/166 |

OTHER PUBLICATIONS

*Chemicals for the Mining Industry*, Ashland Chemical Co. Bulletin 1214–1 (1971).
*Armak Product Data Bulletin No. 73–8*, Armour Industrial Chemicals, (1973).
*Duomac T*, Armour Industrial Chemicals, three pages unnumbered, (1977).
*GMELIN 49*, Nb(B4), pp. 334–344.
Sidgwick, N. V., *The Chemical Elements and Their Compounds*, vol. 1, Oxford, Clarendon Press, pp. 840–841, (1950).
*ADOGEN Fatty Amines, Diamines, and Amides*, Sherex Chemical Co., Inc., Dublin, Ohio, pp. 1–7.
*Ethoxylated Fatty Amines*, Ashland Chemical Co., pp. 1–5, Bulletin 1294.
*Arbsurf Cationic Flotation Reagents for the Iron Mining Industry*, Bulletin 1301, Ashland Chemical Co., pp. 1–15.
Palache, et al, *The System of Mineralogy*, vol. I, 7th ed., John Wiley and Sons, Inc., pp. 745–755.
Gmeins Handbuch der Anorganischen Chemie "Niob", Verlag Chemie, pp. table of contents, (1972).
Manual of Patent Examining Practice, section 714.22, p. 196, (1980).
*Chemical Abstracts*, Abstract No. 108,831k, vol. 69, No. 26, 12/23/68.
Grant, J., *Hackh's Chemical Dictionary*, 4th edition, McGraw Hill, p. 558, (1969).

*Primary Examiner*—Michael L. Lewis

[57] ABSTRACT

Beneficiation of metallic ores selected from the group of zinc, bismuth, cobalt, nickel, titanium, zirconium, thorium, chromium, molybdenum, wolfram, and uranium, by froth flotation process using commercial amines in conjunction with oxalic acid or alkali oxalates to obtain pure concentrates of said metal values comprises; adding to a water suspension of finely divided ore of amine type collectors and an adequate amount of oxalic acid or a soluble oxalate which acting in conjunction activate and levitate in the froth by usual froth flotation process the metal values of zinc, bismuth, cobalt, nickel, titanium, zirconium, chromium, and uranium minerals; and for molybdenum and wolfram recovering the pulp of mineral slurry are oxidized with hydrogen peroxide, or any strong oxidizing agent and proceed as described above.

1 Claim, No Drawings

FROTH FLOTATION OF ORES

This invention relates to the beneficiation of zinc, bismuth, cobalt, nickel, titanium, zirconium, thorium, chromium, molybdenum, wolfram, and uranium ores. Zinc, bismuth, cobalt, and nickel ores were successfully concentrated by froth flotation method when occured in simple sulfidic ores such as lead, copper, pyrite ores. Bismuth in lead concentrate treated metallurgically yield lead-bismuth alloy, which alloy is thereon treated by a metallurgical process to obtain pure bismuth metal. Cobalt-nickel minerals in bulk copper concentrate yield by known metallurgical process copper-nickel-cobalt matte, which furtheron is refined to pure metals. Titanium, zirconium, thorium, chromium, wolfram ores were mostly beneficiated by gravity concentration followed by electrostatic or magnetic separation of main or accessory minerals. Aside from that practice, which in some instances was successful, the electrostatic and magnetic separation equipments are expensive investment especially when they represent supplementary investments. The froth flotation process being superior from the standpoint of yield and capacity throughput, is the main process in application of this invention.

Accordingly, this invention has as an object the provision of a practical and economical process for the beneficiation of zinc in the presence of copper and lead minerals, by which procedure the depression of zinc mineral, followed by tickening and activating by copper sulfate in high alkaline pulp of mineral slurry is entirely omitted, which represents a great saving in zinc circuit. Moreover, metallic bismuth or bismuth minerals in various occurences may be directly floated, which shortens the long and expensive metallurgical way for obtaining metallic bismuth. Furthermore, cobalt and nickel minerals in matrix of copper, pyrite, or pyrhotite, or in ferromagnesian silicates, or in manganese minerals, may be directly floated in the pulp of corresponding mineral slurry in which accessory minerals rest unaffected. Moreover, titanium, zirconium, thorium, chromium, and wolfram minerals concentrated until now by gravity methods, will by this invention be concentrated by froth flotation. Molybdenum, and uranium minerals are also amenable to froth flotation procedure of this invention. Another object of this invention is to provide a mineral concentration treatment for the beneficiation of said metal values involving selective activation of a desired mineral and the production of a high-grade concentrate with maximum recovery of desired metallic mineral of above enumerated metals with a very low consumption of reagents.

The object of this invention is to provide an improved froth flotation procedure in which through the application of commercial amines in conjunction with oxalic acid or alkali oxalates, wanted minerals selected from the group of zinc, bismuth, cobalt, nickel, titanium, zirconium, thorium, chromium, molybdenum, wolfram, and uranium minerals in respective ores are activated and floated in the froth formed by agitating and aerating the pulp of mineral slurry.

The trademark amines used in this invention having trade mark names such as:
AROSURF MG 83-A, which is Tridecyletherdiamine acetate
AROSURF MG 98-A, which is Tridecyletheramine products of ASHLAND CHEMICALS
ADOGEN 163, which is Laurylamine
ADOGEN 170-D, which is Tallowamine
ADOGEN 560, which is Cocodiamine
ADOGEN 570-S, which is Tallowdiamine products of ASHLAND CHEMICALS
ALAMINE 336 which is Trioctyl tert. amine product of GENERAL MILLS The AROSURF type amines are silica flotation reagents, used primarily for upgrading magnetic concentrate and oxidized taconite ore.

The ADOGEN type amines are reagents for silica, mica, feldspars, and the like silicates.

The ALAMINE type amines are reagents which function as liquid ion exchange reagents in the extraction and concentration of metals from aqueous acidic solutions as well as extractants for metals from acidic leach solutions. ALAMINE 336 being insoluble in water was added to the pulp of mineral slurry as hydrochloride, to be soluble in water and fairly reactive.

Such versatile applications of said amines and not as direct froth flotation reagents, said amines when used in conjunction with oxalic acid or any soluble oxalate, acting complexing, become metallic mineral collectors, which is the essence of this invention, and a real improvement in froth flotation art.

The special feature of this invention is that cationic reagents of amine type which are effective froth flotation reagents for silica and the silicates, provoking in this way a reverse froth flotation process, in which the unaffected metallic mineral found in the tailing of a distinct pulp of mineral slurry represent the concentrate, a product which may contain either one or a gamut of metallic minerals which are to be separated in specific concentrates and tailings of respective metallic minerals. Such a procedure is complicated since several separate process are to be practiced to obtain the final concentrate of wanted mineral. By applying the present invention it is feasible to obtain not only selected metal value, but also an increased recovery of enumerated metal values in respective froth concentrates, with a reduction in reagent requirements and costs, a substantial advance is feasible in the field of recovering of diverse minerals.

An object of the present invention is to accomplish the above results. A further object is to provide a process requiring only one flotation operation to produce a finished concentrate with a reduction in reagent requirements and costs, and an increase in mineral recovery. A further object is to provide a process which tolerates relatively large amounts of $-150$ mesh slimes withouth serious affecting reagent consumption or metallurgical results, so that the desliming and sizing of the feed is less critical. A further object is to provide a process permitting the plant to operate efficiently at lower conditioning time and lower percent of solids levels. Yet another object is to provide a process which greatly extends the pH range in which good conditioning and flotation are possible. Other specific objects and advantages will appear as the specific proceeds.

Although the exact mechanism by which the amines, i.e., the trade mark amines selected from the group of AROSURF MG 93-A, AROSURF MG 98-A, ADOGEN 163, ADOGEN 170-D, ADOGEN 560, ADOGEN 570-S, and ALAMINE 336, perform teir useful function in conjunction with oxalic ion in processes of this invention is not fully understood, which until now is neither observed nor explained, because trade mark amines were used only as silica and silicate responsive reagents. Therefore, the addition of oxalic acid or any soluble oxalate is indispensable. The oxalic acid or oxalate additions are not simple modifier and gangue depressors, but are co-promoter to the action of trade mark amines, The addition of amine promote and float silica and the silicates, while the wanted minerals are concentrated in tailing. The addition of oxalic acid the phenomenon becomes reverse, the silica and the silicates disappear from the froth, while the froth becomes colored of the wanted mineral.

In carrying out this invention in accordance with the foregoing principle, the selected ore is ground, sized, and then preferably, although not necessarily deslimed by washing to remove colloidally dispersed material, and thereafter the sands are diluted to a pulp consistency of generally about 25 percent solids. Thereafter, the pulp is conditioned for several minutes by agitating with an amount of the order from 0.02 to 0.2 kg per ton of ore treated of oxalic acid or alkali oxalate, and simultaneously is added a selected trade mark amine of AROSURF, ADOGEN, or ALAMINE type, in an amount of the order of 0.01 to 0.1 kg per ton of ore treated. Said additions to a distinct pulp of mineral slurry produce a floating froth product of selected mineral of the respective mineral slurry by agitating and aerating. The usual rougher and cleaner procedures are employed and this invention can well be utilized in a cyclic process wherein the decanted and filtered spent water and the middling ore fraction are returned to the process, saving in this way the unused reagents, as well as omitting the spoiling of environment water courses.

The foregoing process greatly improves the selectivity in the froth flotation of zinc mineral in the presence of copper, lead, pyrite minerals; cobalt and nickel minerals from copper and iron sulfide minerals; titanium, zirconium, thorium, chromium and uranium minerals from iron minerals and accessory silicious minerals as well as other occasional impurities; molybdenum, i.e., molybdenite from copper sulfide and iron sulfide minerals; metallic bismuth from wolframite and the like minerals, which will be furtheron explained, bismuth minerals from tin and the like minerals. All the said straight or selective separations are feasible with cationic-type collectors of trademark amines type in conjunction with oxalic acid or soluble oxalate. The process further reduces the need for close plant control in critical areas, such as desliming, sizing, conditioning, and reagent rates, reducing flotation reagent requirements and processing costs. Further, the process increases the metal recovery.

Highly efficient results and considerable reagent economy have been effected in the practicing this invention when the said trade mark amine collectors were employed in conjunction with oxalic acid or soluble oxalates with ore slurry, and to this end it is preferred to employ said amines in small or very small amount only, because said trade mark amines develop to much froth, being thus very effective collector-frothers.

The Examples of investigations of the trade mark amines such as: AROSURF MG 83-A, AROSURF MG-98-A, ADOGEN 163, ADOGEN 170-D, ADOGEN 560, ADOGEN 570-S, all products of ASHLAND CHEMICALS, and ALAMINE 336 product of GENERAL MILLS in conjunction with oxalic acid or sodium oxalate were performed with natural ores of porphyry copper-zinc ore; metallic bismuth and bismuthite-wolframate ore (Korea ore); Duluth gabro copper-nickel ore, cobalt-pyrite ore; ilmenite-magnetite ore; zircon sand ore; monazite ore; chromite in serpentine; copper-molybdenite ore; and carnotite ore.

Copper in copper-zinc ore was unaffected by amine-oxalate promoter-collector, thus zinc mineral was floated first, copper second with usual copper reagent. Wolframite in bismuth-bismuthite-wolframate ore was unaffected by a simple combination of amino-oxalate promoter-collector. Bismuth was floated first, wolframite second after the pulp of mineral slurry was treated with hydrogen peroxide, which oxidize, it is supposed, the $WO_3$ to $WO_4$ which as such is affected by the said combination of amine-oxalate promoter-collector. Instead hydrogen peroxide, strong oxidizing agents such as persulfate, or produce the same oxidizing effect. Copper in copper-nickel ore was unaffected by amine-oxalate promoter-collector, while nickel is floated out, copper was recovered by usual copper collectors. Nickel silicate in serpentine floats, leaving serpentine anaffected. In cobalt-pyrite ore, pyrite is unaffected, while cobalt mineral floats. In ilmenite-magnetite ore the most frequent mineral combination, magnetite is unaffected while ilmenite is floated. Zircon in zircon sand floats normally. Lode monazite with a gamut of accessory minerals is successfully floated leaving all other minerals anaffected silica included. Chromite in serpentine floats readily leaving serpentine and the like ferromagnesian silicates unaffected. In copper-molybdenite ore the pulp of mineral slurry was treated with hydrogen peroxide, which oxidizes molybdenite to $MoO_4$, which as much is affected by the said combination of amino-oxalate promoter-collectors, while copper is unaffected under said conditions. Carnotite in silicate shists floats readily.

TABLE 1

| Example ore treated | Promoter kg/t | Collector kg/t | Feed % | Recovery % conc. | Recovery % tailing |
|---|---|---|---|---|---|
| 1. Sphalerite zinc blende | Oxalic acid 0.05 | AROSURF MG-83A 0.02 | Zn % 6.2 | 86.4 | 13.6 |
| 2. Bismuth-wolfram ore | 0.01 | ADOGEN 560 0.01 | Bi % — | 90.0 | 10.0 |
| 3. Cobalt arsenide ore | 0.04 | AROSURF MG-98A 0.02 | Co % 2.1 | 85.0 | 15.0 |
| 4. Sudbury nickel ore | 0.05 | ADOGEN 163 0.03 | Ni % 2.9 | 88.0 | 12.0 |
| 5. Alard Lake Ilmenite-magnetite ore | 0.1 | ADOGEN 570-S 0.06 | Ti % 14.0 | 82.0 | 18.0 |
| 6. Cyprus chromite ore | 0.2 | AROSURF MG-83A 0.1 | $Cr_2O_3$ % 26.0 | 94.0 | 6.0 |
| 7. Copper-molybdenum ore | 0.02 | ADOGEN 560 0.01 | Mo % 1.6 | 81.0 | 19.0 |
| 8. Bismuth-wolframite ore | 0.04 | ALAMINE 336 0.02 | W % 4.0 | 87.0 | 13.0 |
| 9. Carnotite | 0.02 | ADOGEN 170.D 0.01 | U % — | 90.0 | 10.0 |

All investigated trade mark amines in conjunction with oxalic acid or soluble oxalates yielded high recoveries and pure concentrates. In each tailing it was visible under the microscope only the coarse grains of wanted minerals.

Table 1, shows that commercial amines are excellent collector-frothers for metallic minerals of various metals such as zinc, bismuth, cobalt, nickel, titanium, zirconium, thorium, molybdenum, wolfram, and uranium, when used in conjunction with oxalic acid or soluble oxalates, i.e., alkali oxalates. Thus, the trade mark amines such as: AROSURF MG-83-A, AROSURF MG-98-A, ADOGEN 163, ADOGEN 170-D, ADOGEN 560, ADOGEN 570-S, products of ASHLAND CHEMICALS Inc., and ALAMINE 336, product of GENERAL MILLS, which independently used and alone are excellent collector-frothers for silica and the silicates, or extractants of acids or metals from their aqueous solutions, which in conjunction with oxalic acid or alkali oxalate act as collectors for zinc, bismuth, cobalt, nickel, titanium, zirconium, thorium, chromium, molybdenum, wolfram, and uranium minerals. If used in an amount higher than needed for complexing of the wanted minerals, said amines will activate silica and the silicates spoiling thus the rougher concentrates. The cleaning procedure and an adequate amount of added oxalic acid will yield an adequately clean concentrate of the wanted metallic mineral. Thus, the reagent control is important and successful.

Considering the results, the conclusion is: that not only the ratio of concentration of valuable mineral is considerably raised, but also is highly performed with reagents which normally are not metallic mineral collectors. A feasible froth flotation process is modified by which the ratio of depressed gangue or a valuable mineral is considerably lowered by conditioning the pulp of mineral slurry with said commercial amines in conjunction with oxalic acid or soluble oxalates. Therefore, the use, according to the present invention of commercial amines in conjunction with oxalic acid or any soluble oxalate for accomplishing the purpose of collecting minerals of zinc, bismuth, cobalt, nickel, titanium, zirconium, thorium, chromium, molybdenum, wolfram, and uranium in a process of unaffected gangue and certain secondary valuable mineral occasionally present in a distinct mineral slurry constitutes a marked advance in the art of froth flotation, and is highly advantageous in improving the selectivity by the used collectors, thus improving the grade of concentrate.

What is claimed is:

1. In concentrating by froth flotation of metallic ores selected from the group of molybdenum and wolfram, which includes the subjecting of such ore material when finely ground to froth flotation process which comprises; the step of oxidizng the molybdenum and wolfram mineral slurry to peroxy molybdenum and peroxy wolfram state with hydrogen peroxide or persulfate; the step of adding to the oxidized mineral slurry an amount of the order from 0.02 to 0.2 kg per ton of ore treated, oxalic acid or alkali oxalate and an amount of the order from 0.01 to 0.1 kg per ton of ore treated amines selected from the group of cocodiamine, or trioctylamine; said additions to aqueous dispersion of ore produce a float product of said mineral values by continuous agitation and aeration of the aqueous dispersion of ore; and separating and recovering the mineral values as froth concentrate products.

* * * * *